United States Patent
Xu et al.

(10) Patent No.: US 11,741,128 B2
(45) Date of Patent: Aug. 29, 2023

(54) MODEL-FREE HIGH CONFIDENCE DATA CLUSTERING

(71) Applicant: International Business Machines Corporation, Armonk, NY (US)

(72) Inventors: Jing Xu, Xian (CN); Xue Ying Zhang, Xian (CN); Si Er Han, Xian (CN); Xiao Ming Ma, Xian (CN); Ji Hui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 17/313,190

(22) Filed: May 6, 2021

(65) Prior Publication Data

US 2022/0358146 A1   Nov. 10, 2022

(51) Int. Cl.
  *G06F 17/00* (2019.01)
  *G06F 16/28* (2019.01)
  *G06N 5/04* (2023.01)
  *G06N 20/00* (2019.01)
  *G06F 16/25* (2019.01)

(52) U.S. Cl.
  CPC .......... *G06F 16/285* (2019.01); *G06F 16/258* (2019.01); *G06N 5/04* (2013.01); *G06N 20/00* (2019.01)

(58) Field of Classification Search
  CPC ....... G06F 16/285; G06F 16/258; G06N 5/04; G06N 20/00
  See application file for complete search history.

(56) References Cited

U.S. PATENT DOCUMENTS 6,353,767 B1   3/2002   Wakeman
8,155,931 B2 *  4/2012   Rubin ................. G06F 8/10
                                          703/2

(Continued)

FOREIGN PATENT DOCUMENTS

CN   111353603   6/2020
CN   111612080   9/2020

OTHER PUBLICATIONS

Akshayvarun Subramanya, Confidence estimation in Deep Neural networks via density modelling, Video Analytics Lab, Department of Computational Indian Institute of Science, Jul. 2017, pp. 1-6.

(Continued)

*Primary Examiner* — Greta L Robinson
(74) *Attorney, Agent, or Firm* — Matt Zehrer; Otterstedt & Kammer PLLC

(57) ABSTRACT

A method of clustering data generated by an unknown model, the method including accessing the data, wherein the data includes a prediction target and a confidence, extracting a data group with high prediction confidence from the data, wherein the data group comprises a plurality of data cases, and where each of the data cases is described by a plurality of predictors, identifying high rank predictors of each the data cases in the data group, transforming the data group into a transformed data group including only the high rank predictors for each of the data cases, wherein the high rank predictors are ranked within each of the data cases included in the transformed data group, clustering the transformed data group to generate clusters, and profiling the clusters to extract an insight about the unknown model.

20 Claims, 9 Drawing Sheets

(56) References Cited

U.S. PATENT DOCUMENTS

| | | | | |
|---|---|---|---|---|
| 8,386,232 | B2* | 2/2013 | Peng | G06F 40/53 |
| | | | | 600/513 |
| 8,868,472 | B1 | 10/2014 | Lin | |
| 10,311,368 | B2* | 6/2019 | Lokare | G06N 20/20 |
| 2015/0234905 | A1* | 8/2015 | Carasso | G06F 3/04842 |
| | | | | 707/602 |

OTHER PUBLICATIONS

Chengbin Peng, Deep Learning Resolves Representative Movement Patterns in a Marine Predator Species, Appl. Sci., Jan. 2019, pp. 1-13.

Lars Hulstaert, Explaining impact of predictors in rankings: an illustrative case of states rankings, Towards Data Science, Jul. 2018, pp. 1-7.

A.E. Rodriguez, Interpretable confidence measures for decision support systems, Journal of Business Analytics, Apr. 2019, pp. 1-10.

Sebastian Briesemeister, No. Longer Confidential: Estimating the Confidence of Individual Regression Predictions, PLoS ONE 7(11), Nov. 2012, pp. 1-9.

Jasper Van Der Waa, Understanding model predictions with LIME, International Journal of Human-Computer Studies, Jun. 2020, pp. 1-11.

Avinash Navlani, Comparing clustering algorithms performance using multiple-objective functions, International Journal of Statistics and Applied Mathematics, May 2020; 5(4): pp. 246-248.

Marco Tulio Ribeiro, "Why Should I Trust You?" Explaining the Predictions of Any Classifier, KDD '16 Proceedings of the 22nd ACM SIGKDD International Conference on Knowledge Discovery and Data Mining, Aug. 2016, pp. 1-10.

Lars Hulstaert, Interpreting machine learning models, Towards Data Science, Feb. 2018, pp. 1-11.

Peter J. Rousseeuw, Silhouettes: a graphical aid to the interpretation and validation of cluster analysis, Journal of Computational and Applied Mathematics, Nov. 1987, pp. 53-65.

* cited by examiner

FIG. 4

| id | parm A | parm B | parm C | parm D | parm E | ... | parm N |
|---|---|---|---|---|---|---|---|
| 8321456 | m | 1 | 11.52 | 1001 | 0.3001 | | 54 |
| 8456123 | m | 1 | 12.78 | 1532 | 0.0869 | | 51 |
| 8598673 | d | 0 | 15.57 | 1204 | 0.2114 | | 44 |
| 8599682 | d | 0 | 12.12 | 952 | 0.1933 | | 39 |
| 8654532 | m | 4 | 9.45 | 2345 | 0.1645 | | 66 |
| 8678532 | m | 4 | 10.45 | 1456 | 0.2396 | | 36 |
| 8786542 | m | 3 | 13.42 | 3352 | 0.1127 | | 45 |

*FIG. 5*

| id | parm A | parm B | parm C | parm D | parm E | ... | parm N | predicted target | confidence |
|---|---|---|---|---|---|---|---|---|---|
| 8321456 | m | 1 | 11.52 | 1001 | 0.3001 | ... | 54 | ... | 0.95 |
| 8456123 | m | 1 | 12.78 | 1532 | 0.0869 | ... | 51 | ... | 0.56 |
| 8598673 | d | 0 | 15.57 | 1204 | 0.2114 | ... | 44 | ... | 0.77 |
| 8599682 | d | 0 | 12.12 | 952 | 0.1933 | ... | 39 | ... | 0.92 |
| 8654532 | m | 4 | 9.45 | 2345 | 0.1645 | ... | 66 | ... | ... |
| 8678532 | m | 4 | 10.45 | 1456 | 0.2396 | ... | 36 | ... | ... |
| 8786542 | m | 3 | 13.42 | 3352 | 0.1127 | ... | 45 | ... | ... |

*FIG. 8*

| id | parm A | parm B | parm C | parm D | parm E | ... | parm N |
|---|---|---|---|---|---|---|---|
| 8321456 | m | 1 | 11.52 | 1001 | 0.3001 | | 54 |
| 8456123 | m | 1 | 12.78 | 1532 | 0.0869 | | 51 |
| 8598673 | d | 0 | 15.57 | 1204 | 0.2114 | | 44 |
| 8599682 | d | 0 | 12.12 | 952 | 0.1933 | | 39 |
| 8654532 | m | 4 | 9.45 | 2345 | 0.1645 | | 66 |
| 8678532 | m | 4 | 10.45 | 1456 | 0.2396 | | 36 |
| 8786542 | m | 3 | 13.42 | 3352 | 0.1127 | | 45 |

MODEL-FREE HIGH CONFIDENCE DATA CLUSTERING

BACKGROUND

The present disclosure relates generally to machine learning, and more particularly to a model-free clustering of data, where extracted clusters have high prediction confidence.

Many data science tools employing machine learning appear to function as black-box methods. For example, for a data science problem that determines a solution, e.g., a model Z, for data X with labels Y, the model Z is often structured as a decision tree, which can be difficult to understand. Model interpretation seeks to provide interpretations and understanding of the model Z. Stated another way, model interpretation provides useful interpretations of why a particular prediction is generated by the machine learning method for a particular data case.

SUMMARY

According to some embodiments of the present invention, a method of clustering data generated by an unknown model includes accessing the data, wherein the data includes a prediction target and a confidence, extracting a data group with high prediction confidence from the data, wherein the data group comprises a plurality of data cases, and where each of the data cases is described by a plurality of predictors, identifying high rank predictors of each the data cases in the data group, transforming the data group into a transformed data group including only the high rank predictors for each of the data cases, wherein the high rank predictors are ranked within each of the data cases included in the transformed data group, clustering the transformed data group to generate clusters, and profiling the clusters to extract an insight about the unknown model.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

BRIEF DESCRIPTION OF THE DRAWINGS

Preferred embodiments of the present invention will be described below in more detail, with reference to the accompanying drawings:

FIG. 4 is an illustration of data input into a model according to some embodiments of the present invention;

FIG. 5 is an illustration of data output by a model according to some embodiments of the present invention;

FIG. 8 is an illustration of a method of identifying predictors according to the method of FIG. 3;

DETAILED DESCRIPTION

Figure 1:
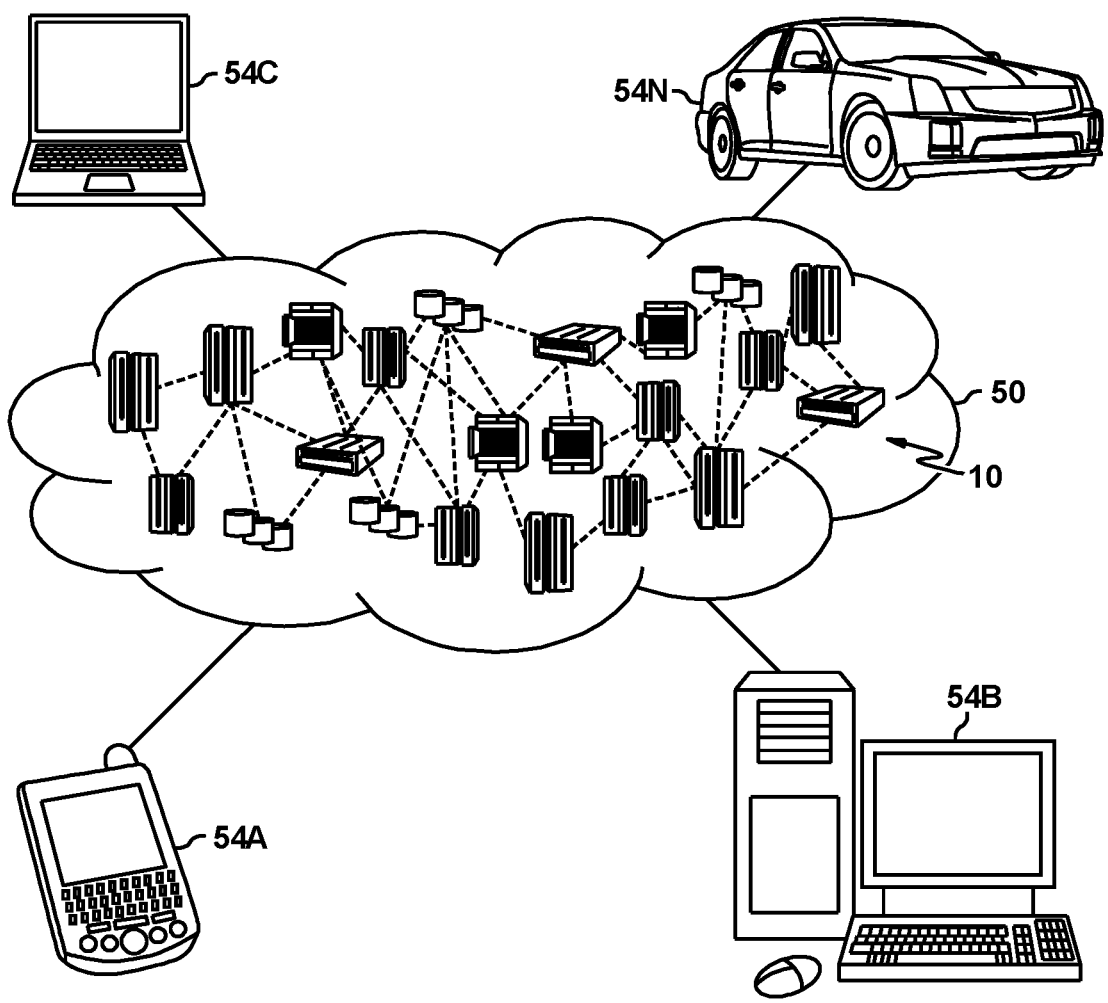
FIG. 1 depicts a cloud computing environment according to an embodiment of the present invention.

Embodiments of the present invention relate to model-free clustering of data, where extracted clusters have high prediction confidence. According to at least one embodiment, insights extracted from the clusters will inherit the high prediction confidence of the underlying clusters.

Embodiments of the present invention relate to extracting clusters that can improve the interpretability of data and machine learning models. Methods improving the interpretability of a model can be useful in ensuring that the model is aligned with a problem to be solved.

Decision trees are a popular tool in machine learning since model interpretations methods can be readily applied. For other models, such as Neural Networks (NN), Support Vector Machines (SVM), and so on, the interpretation of the predictions can be difficult. According to some embodiments of the present invention, improved interpretability is achieved for models having hidden layers, such as hidden Markov decision tress (HMDT), NN, SVMs, and the like.

Techniques of the present invention can provide substantial beneficial technical effects. For example, one or more embodiments may provide for:

improved clustering wherein transformed data is clustered to avoid effects of non-relevant predictors on the clustering;

improved clustering wherein the clustering is tuned to each data case on the basis of different sets of the predictors (i.e., the predictors extracted for each data case);

selection and deployment of models based on improved clustering of data; and selection of a clustering model based on a comparison of insights.

These and other features and advantages of the present invention will become apparent from the following detailed description of illustrative embodiments thereof, which is to be read in connection with the accompanying drawings.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
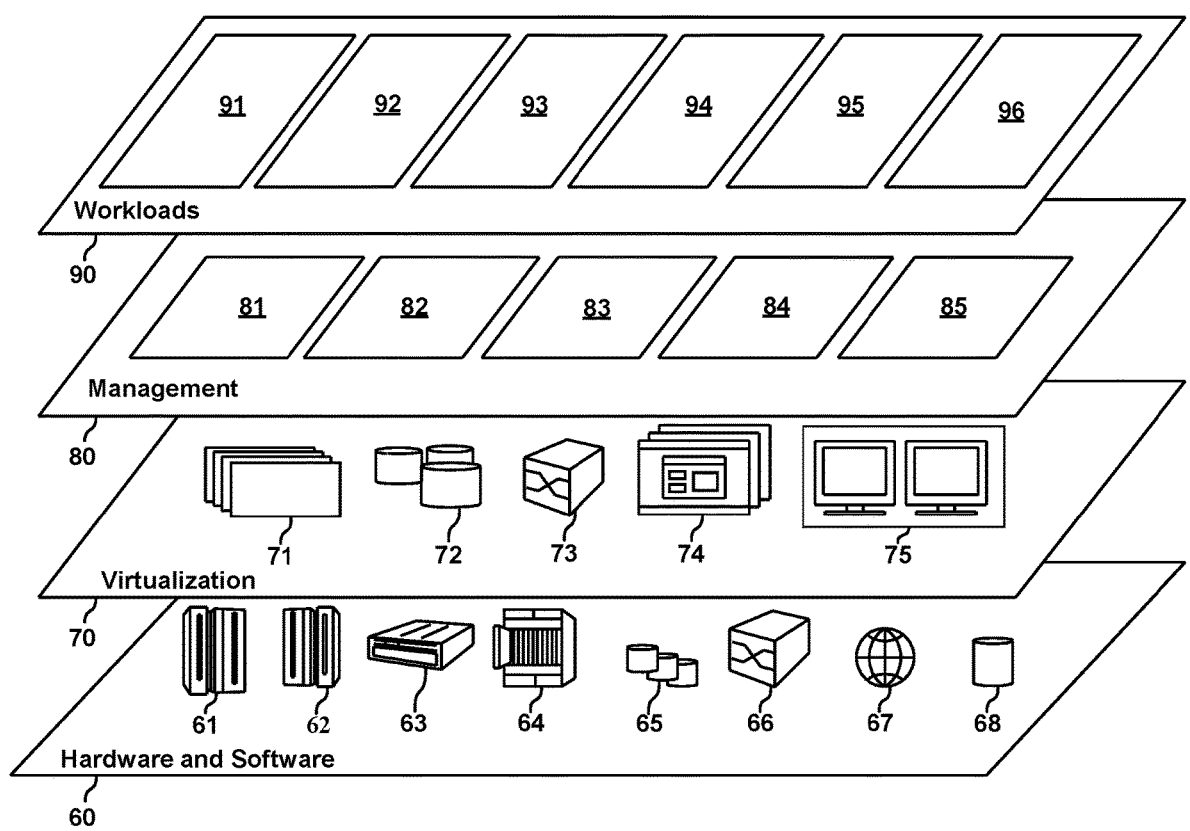
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and extraction of clusters from a data group, where the clusters, and any resulting insights, are associated with high prediction confidence 96.

Figure 3:
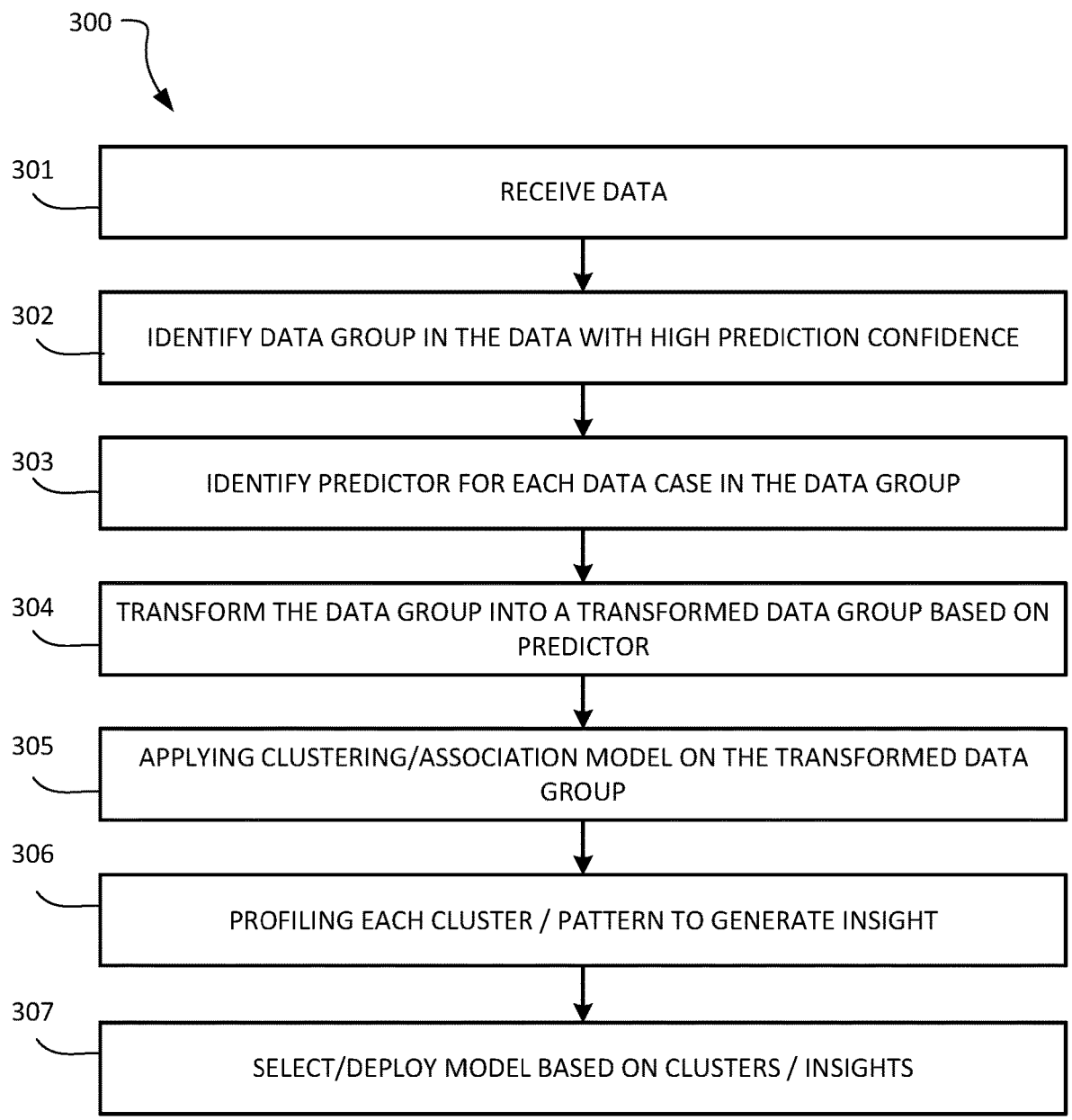
FIG. 3 is an illustration of a method of deriving insights from data according to an embodiment of the present invention.

Embodiments of the present application enable model-free clustering of data output by a model, where each extracted cluster has a high prediction confidence. Referring to FIG. 3, a method of model-free clustering of data output by a model 300 comprises receiving the data 301, identifying a data group in the data 302, identifying a plurality of predictors for each data case in the data group 303, transforming the data group into a transformed data group 304 based on the predictors, applying a clustering model on the transformed data group 305, and profiling each cluster or pattern to generate an insight 306. According to some embodiments, the profiled model providing the data (for example, see FIG. 5) can be selected 307, e.g., by comparing the clusters for the model to clusters extracted from data output by another model that was similarly profiled.

According to some embodiments, FIG. 4 is an example table 400 including input data used by a model to produce the data be processed according to FIG. 3. The input data is processed by the model, which outputs a prediction 501. According to some embodiments, a prediction confidence 502 is determined for the prediction 501. The prediction confidence 502 can be output by the model; the prediction confidence 502 is associated with the prediction and is generated by the model.

According to some embodiments, a data group is identified at block 302 from the prediction data 501 based on a threshold on prediction confidence 502 (see FIG. 5).

Figure 6:
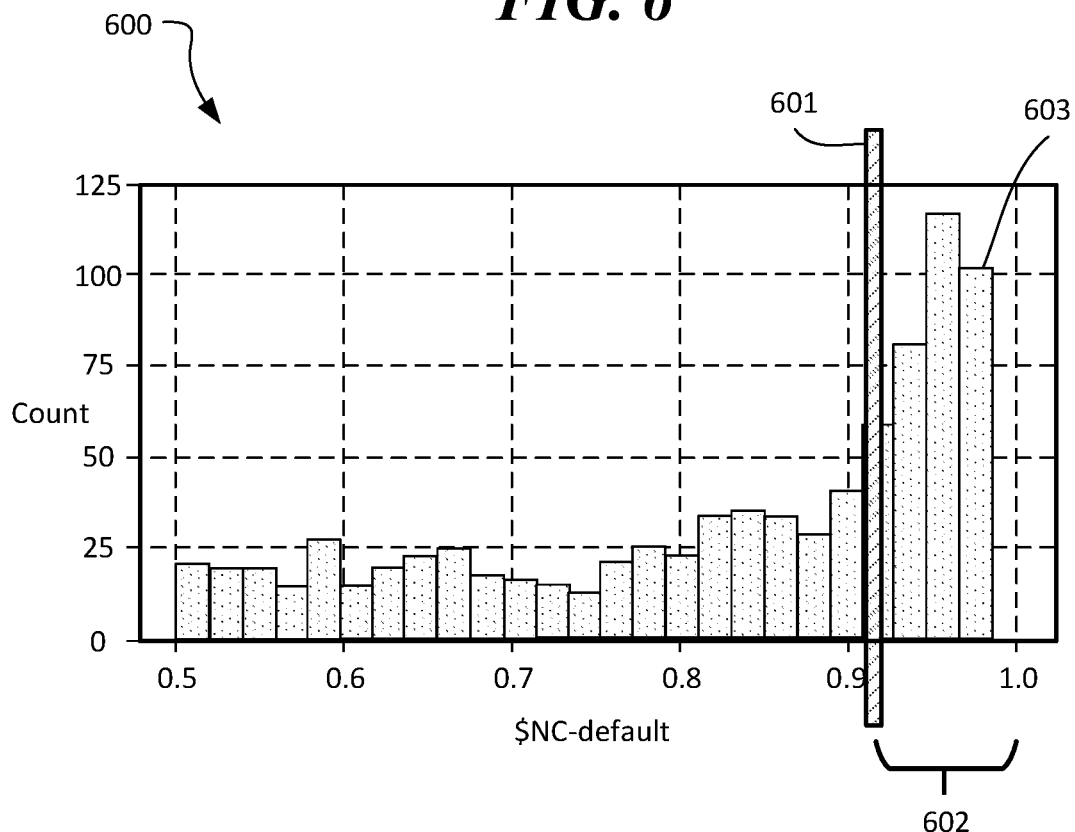
FIG. 6 is an illustration of a method for setting a threshold according to the method of FIG. 3.

According to some embodiments and referring to the graph 600 of FIG. 6, at block 302, the identification of the data group comprises determining a prediction confidence 502 for each prediction target 501 of the model and applying a confidence threshold 601 on the prediction confidences to identify a group 602 (a data group) among the predicted targets 501. The confidence threshold ensures that the identified data group 602 has a high prediction confidence.

According to some embodiment, the confidence threshold 601 can be user specified (e.g., received by a computer from a user) or determined programmatically as a point where a statistically significant change is detected in the predicted targets. For example, the confidence threshold 601 can be a level of statistical significance expressed as a p-value less than or equal to 0.05. It should be understood that the value of statistical significance is illustrative, and that other values and measures can be used.

In the exemplary case of a programmatically determined confidence threshold 601, the determined threshold 601 can found by a Z-test to correspond to some p-value (e.g., 0.08). The Z-test can determine a point where a statistically significant change is detected in the predicted targets. It should be understood that the confidence threshold 601 in FIG. 6 is illustrated in view of prediction targets, e.g., 603, related to default (e.g., a predicted default on a financial obligation).

According to at least one embodiment, a prediction confidence is generated by a predictive model for each data case in the data (e.g., each of the 100 data cases contributing to the prediction targets counted at 603). The prediction confidence can be a value in the range of [0, 1]. According to at least one embodiment, a higher prediction confidence corresponds to a higher probability that the prediction is correct. The threshold on prediction confidence is used to extract the data group of data cases having high prediction confidence.

Figure 7:
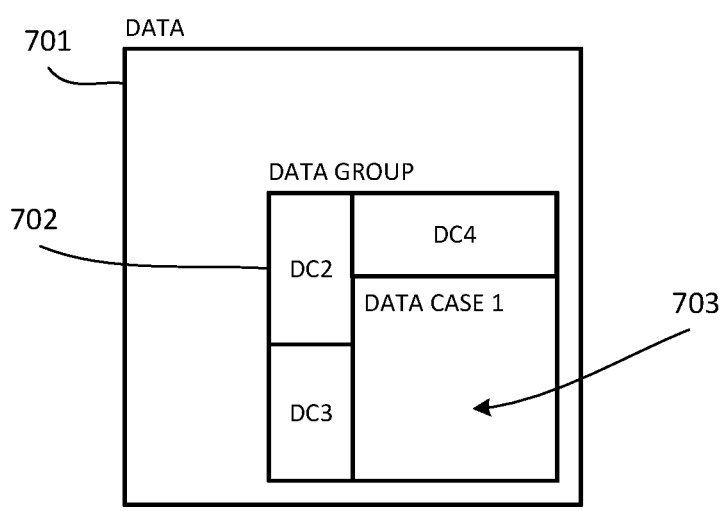
FIG. 7 is an illustration of a hierarchy of data according to an embodiment of the present invention.

As shown in FIG. 6, the data group 602 includes data cases with prediction confidences higher than the threshold. FIG. 7 illustrates a hierarchy of the data 701 (e.g., the original data 400 or the augmented data 500 including the prediction targets and confidences), the data group 702, and the data cases (DC 1-4), e.g., 703 of the data group 702.

According to some embodiments, at block 303, the identification of predictors for each data case in the data group (see 800, FIG. 8) includes using Local Interpretable Model-agnostic Explanations (LIME) to identify a set of most influential predictors, e.g., 801-803, which result in a particular prediction. According to at least one embodiment, each data case is a record that includes multiple features or fields. For example, in FIG. 8, each data case corresponds to a different row, e.g., one data case correspond to the row associated with identifier (id) "8599682".

LIME is a known technique that explains predictions of a classifier in an interpretable manner by learning an interpretable model locally around the prediction. More particularly, LIME samples instances output by an unknown decision function $f$ obtains predictions using $f$, and weighs the predictions by the proximity to a given instance being explained, such that a locally faithful learned explanation of the function f is generated using the weighted predictions.

Figure 9:
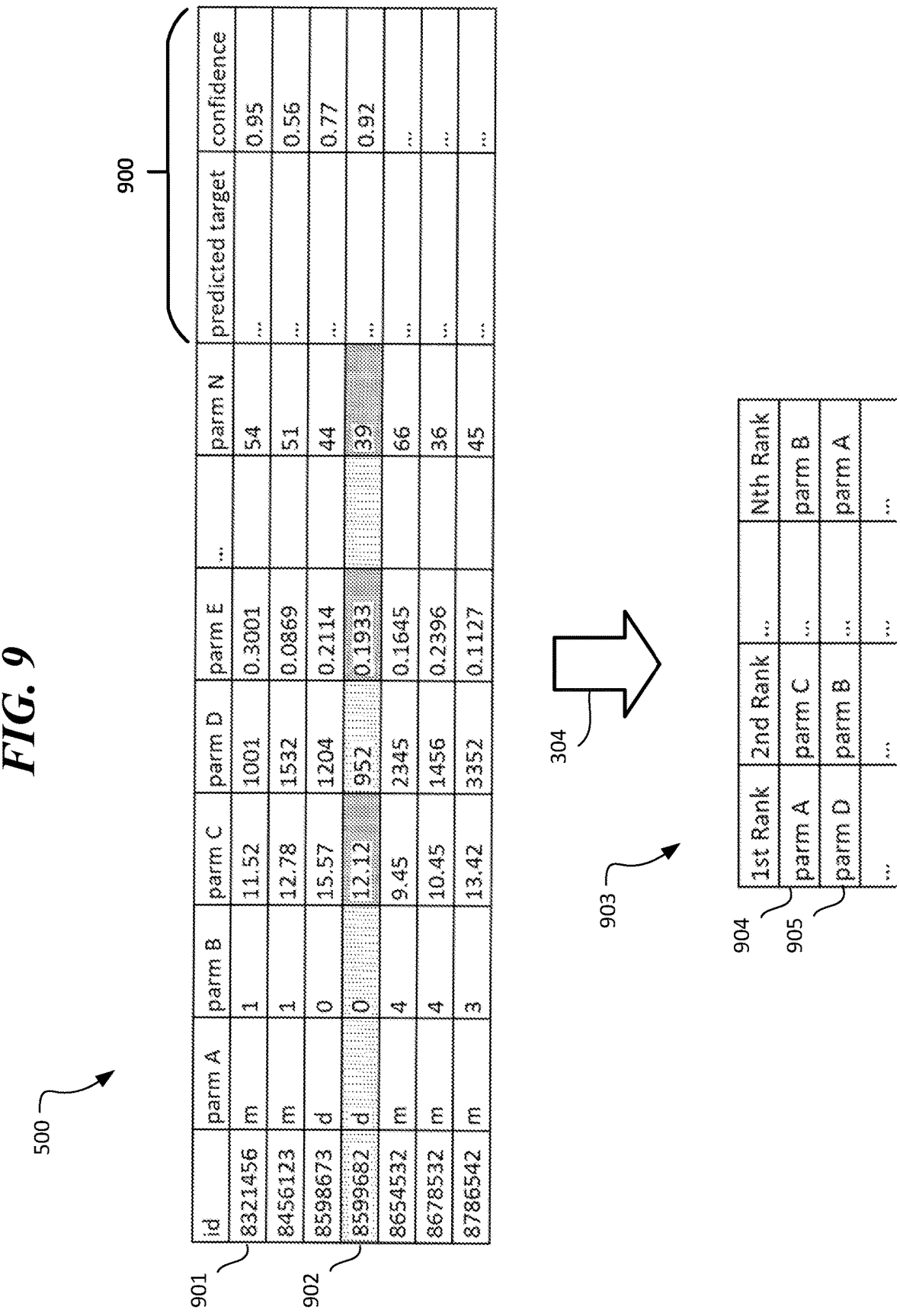
FIG. 9 is an illustration of a data transformation according to some embodiments of the present invention.

According to some embodiments, at block 304, the transformation of the data group having the high prediction confidence into the transformed data group (see FIG. 9) comprises keeping only the most top N important predictors for each data case that has a high prediction confidence (e.g., 901 and 902). As shown in FIG. 9 the received data 500 including the prediction data 900, including a determined prediction confidence for each data case (row). According to some embodiments, the prediction target is a factor of interest to a data scientist. More generally, the prediction target can be an outcome (e.g., value) determined by the model on the basis of the data 400 (see FIG. 4) including one or more predictor variables.

As shown in FIG. 9, using an example confidence threshold of 0.90, the transformation 304 outputs the transformed data for the selected data cases 903, where data cases 901 and 902 (i.e., the data cases satisfying the threshold) correspond to rows 904 and 905, respectively in the transformed data 903. According to some embodiments, data cases that do not satisfy the threshold on confidence are excluded from the transformed data 903.

Referring again to FIG. 6, the graph illustrates example predicted targets 600 for each of the data cases in the received data, where the predicted target is related to a likelihood of default (e.g., on a financial obligation) and a resulting subset of the data cases 602 is identified by applying the confidence threshold 601. As shown, there are 100 data cases 603 having a highest likelihood of default (i.e., the prediction target), which are also identified as corresponding to high confidence predictions.

According to one or more embodiments, weights related to the relative importance of the N predictors can be including in the transformed data 903. For example, the method can weight the parameters ("parm") of each column differently, such that the $1^{st}$ rank parameters for each data case have greater weight than lower rank parameters.

According to some embodiments, at block 305, the application of the clustering model on the transformed data group can include an association rule in a case where the weights are not included.

The transformed data is clustered (rather than the original data) since clustering may be affected by the many non-relevant predictors and the most important predictors may be quite different for two cases, though they are similar in distribution. Accordingly, the method includes improved identification of patterns that affect model predictions.

According to some embodiments, at block 306, an insight can be obtained by profiling each cluster or pattern. If an association rule model is used, the frequent patterns are directly the insights. If a clustering model is used, the technique of within-cluster importance can be used to profile each cluster, and the insights are the detected most important features for each cluster.

According to some embodiments, the profiling 306 is based on within-cluster importance. The within-cluster importance indicates which fields (i.e., which of the high rank predictors) are the most important in defining a single cluster. According to some embodiments, the importance is defined by comparing the distribution of the field within a cluster with the overall distribution. Fields with high within-cluster importance for a cluster tend to have distributions that are significantly different from the overall population. According to some embodiments, these fields are used as pointers to the cluster, and they are good candidates to profile the corresponding cluster.

Profiling clusters 306 describes clusters by their N most distinct characteristics (for example, N>0, where the distinct characteristics are selection from among the high rank predictors). For example, in a case of clustering applied to the Boston Dataset (found in the Scikit-learn/Sklearn library), a plurality of clusters can be identified and profiled by particular fields. For example, again working with the Boston Dataset example, in a case where a cluster is described by the fields of CRIM (i.e., per capita crime rate by town) and RM (i.e., average number of rooms per dwelling), where the fields are identified as having relatively high within-cluster importance, the description of each cluster can be as follows:

[low group of 'CRIM', high group of 'RM']

Alternatively, the description of the cluster(s) can be written as:

[2<='CRIM'<10, 7<='RM'<9]

where the intervals are determined by the first and the third quartiles.

By way of example, for a continuous field such as TRIM' in the example, the field can be discretized it into several ordinal categories in order to explain whether its value is high or low in the context of a given cluster. The discretization method can be based on the distribution of the field. For example, in an equal-frequency method, the field can be discretized into four categories, with each category containing roughly the same number of cases. This is equivalent to using the first, second, and third quartiles for the discretization. The category corresponding to the first quartile, i.e., [0, 25%], is named the "low group," and the third quartile (e.g., [75%, 100%]) is named the "high group." The two categories between [25%, 75%] are named the "medium group" in the second quartile. Other methods can be used to determine a value of a high rank predictors of the cluster(s). For example, in some cases mean+2*standard deviation and mean−2*standard deviation can be used to define the "low" and "high" groups, respectively.

In an example application of a marketing campaign, marketing plans can be tailored for each cluster, in order to improve marketing efficiencies, based on the distributions of the fields. For example, if certain fields are determined to be important to the cluster (e.g., to have a highest impact on the cluster), a user can seek to address parameters captured by those fields. In an example of an online sales application, the online sales application can automatically adjust to the determined insights, for example, to place emphasis on certain items for sale (e.g., to sort items appearing on a given webpage), to seasonally adjust inventory, make decisions about advertisements (e.g., times to display certain items, where to place advertisements online, etc.), etc.

According to one or more embodiments, the method 300 provides a model-free method to derive insights from the group with high prediction confidence, which can be applied for any predictive models. By transforming the data using LIME, the method 300 is designed to identify the patterns which really affect model predictions. Focusing on the most valuable data group with high prediction confidence, it supports more effective marketing campaigns.

According to some embodiments, the methods described herein can be implemented in existing statistics and modeler related applications to create an improved product or service. For example, multiple clustering models can be used for data exploration, and a clustering model providing insights more closely aligned to a customer's goals can be selected for use. That is, according to some embodiments, the method includes selecting between multiple clustering models on the basis of their insights. For example, according to some embodiments, a clustering model can be selected 307 by comparing the clusters generated by the model to clusters generated by one or more other models that were similarly used to profile some input data. The comparison of clustered data can include determining an objective function score for the generated clusters and selecting a clustering model with the best performance based on the scores.

It should be understood that embodiments of the present invention are not limited to using an objective function to compare insights. For example, according to one embodiment, a metric for cluster model evaluation can be used, such as a coefficient/score of Silhouette. The Silhouette score ranges between −1 (e.g., indicating a very poor model, e.g., which outputs clusters exhibiting a mis-assignment of data points) and +1 (e.g., indicating an excellent model). According to some embodiments, a Silhouette score greater than 0.5 indicates reasonable partitioning of data, and a score lower than 0.2 means that data does not exhibit cluster structure. According to some embodiments, the silhouette score is calculated as:

$$\text{silhouette score} = (b-a)/\max(a,b)$$

where a is the average intra-cluster distance or the average distance between each point within a cluster and b is the average inter-cluster distance or the average distance between all clusters. By this metric (e.g., a Silhouette score), models can be compared by their clusters and automatically selected.

According to at least one embodiment, the deployment of the selected model can include an automated (e.g., by a computer system that performs the selection) instantiation of the model in a service (e.g., a cloud service), such that one or more hardware devices can execute the model to perform a prediction task for a client.

Recapitulation: According to some embodiments, a method of clustering data includes accessing the data 301, extracting a data group with high prediction confidence from the data 302, wherein the data group comprises a plurality of data cases, identifying high rank predictors of each the data cases in the data group 303, transforming the data group into a transformed data group including only the high rank predictors for each data case 304, wherein the high rank predictors are ranked within each of the data cases included in the transformed data group, clustering the transformed data group to generate clusters 305, and profiling the clusters to extract an insight about the data 306.

According to some embodiments, the insight about the unknown model is generated without generating a model of the data.

According to some embodiments, the identification of the high rank predictors 303 is performed by a Local Interpretable Model-agnostic Explanations (LIME) method.

According to some embodiments, the identification of the high rank predictors for each of the data cases 303 comprises weighing the predictors by proximity to the data case, and identifying, using the weights, the high rank predictors fields of the data case. According to some embodiments, the identification is performed by selecting a given number of the predictors having highest ones of the weights. According to some embodiments, the identification is performed by selecting one or more of the predictors having a weight above a threshold.

According to some embodiments, the transformed data group 304 is a new data structure comprising data elements extracted from the data group. According to some embodiments, the transformed data group 304 is an index pointing to data elements identified from the data group.

According to some embodiments, the profiling further comprises determining a within-cluster importance of each of the high rank predictors for each of the clusters, and extracting a set of the most important of the high rank predictors, wherein the set of the most important of the high rank predictors is the insight about the data.

According to some embodiments, a method of clustering data wherein profiling the clusters further comprises determining a value of each of the high rank predictors fields captured by each of the clusters.

According to one or more embodiments of the present invention, a clustering of the transformed data avoids effects of non-relevant predictors on the clustering and tunes the clustering to each data case on the basis of different sets of the predictors (i.e., the predictors extracted for each data case).

By transforming the data using LIME, our method is designed to identify the patterns which most affect predictions. By focusing on the most valuable data group with high prediction confidence, it supports improved applications, such as effective marketing campaigns.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for organizing and servicing resources of the computer system. Further, a computer program product can include a tangible computer-readable recordable storage medium with code adapted to be executed to carry out one or more method steps described herein, including the provision of the system with the distinct software modules.

Figure 10:
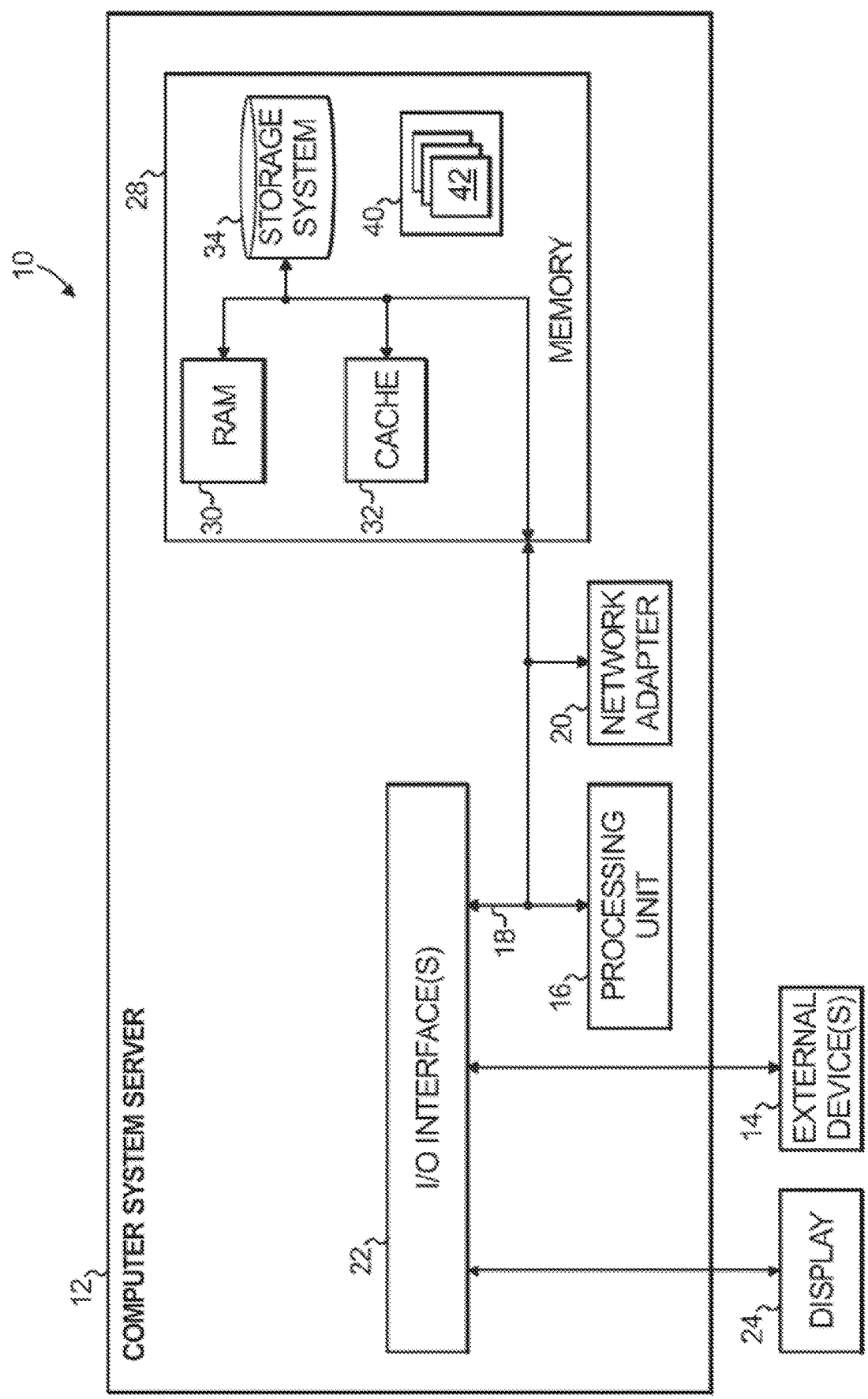
FIG. 10 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 10 depicts a computer system that may be useful in implementing one or more aspects and/or elements of the invention, also representative of a cloud computing node according to an embodiment of the present invention. Referring now to FIG. 10, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a database app in layer 66.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of clustering data generated by an unknown model, the method comprising:
   accessing the data, wherein the data includes a prediction target and a confidence;
   extracting a data group with high prediction confidence from the data, wherein the data group comprises a plurality of data cases, and where each of the data cases is described by a plurality of predictors;
   identifying high rank predictors of each the data cases in the data group;
   transforming the data group into a transformed data group including only the high rank predictors for each of the data cases, wherein the high rank predictors are ranked within each of the data cases included in the transformed data group;
   clustering the transformed data group to generate clusters; and
   profiling the clusters to extract an insight about the unknown model.

2. The computer-implemented method of claim 1, wherein the insight about the unknown model is generated without generating a model of the data.

3. The computer-implemented method of claim 1, wherein the identification of the high rank predictors is performed by a Local Interpretable Model-agnostic Explanations (LIME) method.

4. The computer-implemented method of claim 1, wherein the identification of the high rank predictors for each of the data cases comprises:
   weighing the predictors by proximity to the data case; and
   identifying, using the weights, high rank predictors fields of the data case.

5. The computer-implemented method of claim 4, wherein the identification is performed by selecting a given number of the predictors having highest ones of the weights.

6. The computer-implemented method of claim 4, wherein the identification is performed by selecting one or more of the predictors having a weight above a threshold.

7. The computer-implemented method of claim 1, wherein the transformed data group is a new data structure comprising data elements extracted from the data group.

8. The computer-implemented method of claim 1, wherein the transformed data group is an index pointing to data elements identified from the data group.

9. The computer-implemented method of claim 1, wherein the profiling further comprises:
   determining a within-cluster importance of each of the high rank predictors for each of the clusters; and
   extracting a set of the most important of the high rank predictors, wherein the set of the most important of the high rank predictors is the insight about the data.

10. The computer-implemented method of claim 1, wherein profiling the clusters further comprises determining a value of high rank predictors fields captured by each of the clusters.

11. A non-transitory computer readable storage medium comprising computer executable instructions which when executed by a computer cause the computer to perform a method for clustering data generated by an unknown model, the method comprising:
    accessing the data, wherein the data includes a prediction target and a confidence;
    extracting a data group with high prediction confidence from the data, wherein the data group comprises a plurality of data cases, and where each of the data cases is described by a plurality of predictors;
    identifying high rank predictors of each the data cases in the data group;
    transforming the data group into a transformed data group including only the high rank predictors for each of the data cases, wherein the high rank predictors are ranked within each of the data cases included in the transformed data group;
    clustering the transformed data group to generate clusters; and
    profiling the clusters to extract an insight about the unknown model.

12. The computer readable storage medium of claim 11, wherein the insight about the unknown model is generated without generating a model of the data.

13. The computer readable storage medium of claim 11, wherein the identification of the high rank predictors is performed by a Local Interpretable Model-agnostic Explanations (LIME) method.

14. The computer readable storage medium of claim 11, wherein the identification of the high rank predictors for each of the data cases comprises:
   weighing the predictors by proximity to the data case; and
   identifying, using the weights, high rank predictors fields of the data case.

15. The computer readable storage medium of claim 14, wherein the identification is performed by selecting a given number of the predictors having highest ones of the weights.

16. The computer readable storage medium of claim 14, wherein the identification is performed by selecting one or more of the predictors having a weight above a threshold.

17. The method of claim 11, wherein the transformed data group is a new data structure comprising data elements extracted from the data group.

18. The computer readable storage medium of claim 11, wherein the transformed data group is an index pointing to data elements identified from the data group.

19. The computer readable storage medium of claim 11, wherein the profiling further comprises:
   determining a within-cluster importance of each of the high rank predictors for each of the clusters; and
   extracting a set of the most important of the high rank predictors, wherein the set of the most important of the high rank predictors is the insight about the data.

20. The computer readable storage medium of claim 11, wherein profiling the clusters further comprises determining a value of high rank predictors fields captured by each of the clusters.

\* \* \* \* \*